United States Patent
Acar et al.

(10) Patent No.: US 11,985,014 B2
(45) Date of Patent: May 14, 2024

(54) DIGITAL DEMODULATION FOR WIRELESS POWER

(71) Applicant: Renesas Electronics America Inc., Milpitas, CA (US)

(72) Inventors: Damla Solmaz Acar, La Mesa, CA (US); Pooja Agrawal, Milpitas, CA (US); Jure Menart, Zurich (CH); Tao Qi, San Diego, CA (US); Mihail Jefremow, Dusseldorf (DE); Gustavo James Mehas, Mercer Island, WA (US)

(73) Assignee: Renesas Electronics America Inc., Milpitas, CA (US)

( * ) Notice: Subject to any disclaimer, the term of this patent is extended or adjusted under 35 U.S.C. 154(b) by 195 days.

(21) Appl. No.: 17/831,959

(22) Filed: Jun. 3, 2022

(65) Prior Publication Data
US 2023/0396472 A1    Dec. 7, 2023

(51) Int. Cl.
*H04L 27/06*     (2006.01)
*H02J 50/10*     (2016.01)
*H02J 50/80*     (2016.01)

(52) U.S. Cl.
CPC ............. *H04L 27/06* (2013.01); *H02J 50/10* (2016.02); *H02J 50/80* (2016.02)

(58) Field of Classification Search
CPC ......... H04L 27/02; H04L 27/06; H04L 27/08; H04L 27/10; H04L 27/14; H04L 27/144; H02J 50/00; H02J 50/10; H02J 50/12; H02J 50/80; H02J 50/40; H02J 50/402
See application file for complete search history.

(56) References Cited

U.S. PATENT DOCUMENTS

| | | | | |
|---|---|---|---|---|
| 7,948,703 | B1 * | 5/2011 | Yang | G11B 20/10398 360/68 |
| 8,077,765 | B1 * | 12/2011 | Chaichanavong | H04L 25/03057 375/232 |
| 8,325,844 | B2 * | 12/2012 | Walton | H04L 5/0023 375/267 |
| 8,335,286 | B2 * | 12/2012 | Mergen | H04L 1/1845 375/349 |
| 8,411,806 | B1 * | 4/2013 | Lee | H04L 25/03891 375/349 |
| 8,423,850 | B2 * | 4/2013 | Iwata | G06F 11/3656 398/31 |
| 9,183,422 | B2 * | 11/2015 | Ishizaki | G06K 7/0008 |
| 9,276,404 | B2 * | 3/2016 | Kayama | G06F 1/263 |
| 9,362,742 | B2 * | 6/2016 | Kayama | H02J 9/06 |
| 9,672,089 | B2 * | 6/2017 | Poulo | G06F 11/076 |
| 9,787,366 | B1 * | 10/2017 | Shirani-Mehr | H04W 8/005 |
| 9,912,503 | B2 * | 3/2018 | Chu | H04L 27/22 |

(Continued)

*Primary Examiner* — James M Perez
(74) *Attorney, Agent, or Firm* — SCULLY, SCOTT, MURPHY & PRESSER, P.C.

(57) ABSTRACT

In an embodiment, a semiconductor device is disclosed that includes at least one processing device and firmware including a dynamic demodulation engine. The dynamic demodulation engine, when executed by the at least one processing device, is configured to obtain a digital signal waveform, dynamically select a bit detection method based at least in part on a characteristic of the digital signal waveform, perform demodulation of the digital signal waveform using the selected bit detection method and generate decoded packets based at least in part on the demodulation.

20 Claims, 8 Drawing Sheets

(56) References Cited

U.S. PATENT DOCUMENTS

| | | | | |
|---|---|---|---|---|
| 10,170,943 B2* | 1/2019 | Joye | | H04B 5/72 |
| 10,193,398 B2* | 1/2019 | Park | | H02J 50/80 |
| 10,212,009 B2* | 2/2019 | Qu | | H04L 27/04 |
| 10,819,394 B1* | 10/2020 | Petzel | | H04B 17/318 |
| 11,009,546 B2* | 5/2021 | Hojabri | | G01R 31/2841 |
| 11,088,755 B2* | 8/2021 | Ashrafi | | H04B 7/15507 |
| 11,394,251 B2* | 7/2022 | Agrawal | | H02J 50/80 |
| 11,706,064 B2* | 7/2023 | Kuchi | | H03H 17/02 |
| | | | | 375/232 |
| 11,770,157 B2* | 9/2023 | Mehas | | H02J 50/60 |
| | | | | 307/104 |
| 11,881,732 B2* | 1/2024 | Huang | | H02J 50/80 |
| 11,892,484 B2* | 2/2024 | Vijayakumar | | G01R 19/10 |
| 2010/0327766 A1* | 12/2010 | Recker | | H02J 7/0029 |
| | | | | 362/20 |
| 2011/0037863 A1* | 2/2011 | Mihota | | H04N 23/685 |
| | | | | 348/208.99 |
| 2011/0312278 A1* | 12/2011 | Matsushita | | H04W 4/80 |
| | | | | 455/66.1 |
| 2012/0007441 A1* | 1/2012 | John | | A61N 1/3785 |
| | | | | 307/104 |
| 2012/0019674 A1* | 1/2012 | Ohnishi | | G08C 17/00 |
| | | | | 348/207.1 |
| 2012/0062369 A1* | 3/2012 | Ishizaki | | G06K 7/10009 |
| | | | | 375/259 |
| 2012/0195384 A1* | 8/2012 | Sato | | H04B 3/466 |
| | | | | 375/257 |
| 2012/0299389 A1* | 11/2012 | Lee | | H02J 50/402 |
| | | | | 307/104 |
| 2012/0326657 A1* | 12/2012 | Oettinger | | H04L 7/042 |
| | | | | 320/108 |
| 2013/0039395 A1* | 2/2013 | Norconk | | H04B 5/72 |
| | | | | 375/268 |
| 2013/0058379 A1* | 3/2013 | Kim | | H04B 5/72 |
| | | | | 455/69 |
| 2013/0313903 A1* | 11/2013 | Kayama | | H02J 9/06 |
| | | | | 307/26 |
| 2014/0073243 A1* | 3/2014 | Hijioka | | H04B 5/266 |
| | | | | 455/41.1 |
| 2014/0247140 A1* | 9/2014 | Proud | | A61B 90/98 |
| | | | | 340/870.02 |
| 2014/0247148 A1* | 9/2014 | Proud | | H02J 50/20 |
| | | | | 340/870.02 |
| 2014/0372259 A1* | 12/2014 | Elberbaum | | H04L 65/60 |
| | | | | 705/26.81 |
| 2016/0336785 A1* | 11/2016 | Gao | | H04B 5/72 |
| 2017/0095667 A1* | 4/2017 | Yakovlev | | A61B 5/0022 |
| 2017/0229920 A1* | 8/2017 | Joye | | H02J 50/80 |
| 2017/0288741 A1* | 10/2017 | Zhu | | H04L 27/06 |
| 2017/0294798 A1* | 10/2017 | Yuk | | H04B 5/79 |
| 2017/0324462 A1* | 11/2017 | Chen | | H04B 7/0868 |
| 2017/0353054 A1* | 12/2017 | Lee | | H02J 7/00034 |
| 2019/0393734 A1* | 12/2019 | Zhou | | H02J 50/12 |
| 2020/0101291 A1* | 4/2020 | Yakovlev | | A61N 2/006 |
| 2020/0259373 A1* | 8/2020 | Park | | H02J 50/80 |
| 2020/0336018 A1* | 10/2020 | Abajian | | G01R 23/16 |
| 2021/0099016 A1* | 4/2021 | Bhandarkar | | H02J 50/12 |
| 2021/0143688 A1* | 5/2021 | Agrawal | | H02J 7/0071 |
| 2021/0242907 A1* | 8/2021 | Sherman | | H04B 5/72 |
| 2021/0367457 A1* | 11/2021 | Sherman | | H02J 50/12 |
| 2022/0060062 A1* | 2/2022 | Rosu-Hamzescu | | H02J 50/80 |
| 2022/0224137 A1* | 7/2022 | Huang | | H02J 7/00308 |
| 2022/0224583 A1* | 7/2022 | Rosenthal | | H04L 27/02 |
| 2023/0007413 A1* | 1/2023 | Polinske | | H04R 25/554 |
| 2023/0258694 A1* | 8/2023 | Vijayakumar | | H02J 7/00034 |
| | | | | 375/317 |
| 2023/0269117 A1* | 8/2023 | Mehas | | H02J 50/80 |
| | | | | 375/238 |
| 2023/0275619 A1* | 8/2023 | Mehas | | H02J 50/60 |
| 2023/0352986 A1* | 11/2023 | Youn | | H04W 4/80 |
| 2023/0361630 A1* | 11/2023 | Narayanan | | H02J 50/80 |
| 2023/0369916 A1* | 11/2023 | Kim | | H01F 38/14 |
| 2023/0378822 A1* | 11/2023 | AbuKhalaf | | H02J 50/80 |
| 2023/0388174 A1* | 11/2023 | Acar | | H04B 5/72 |
| 2023/0396472 A1* | 12/2023 | Acar | | H02J 50/10 |

* cited by examiner

DIGITAL DEMODULATION FOR WIRELESS POWER

BACKGROUND OF THE SPECIFICATION

The present disclosure relates in general to apparatuses and methods for communication between wireless power transmitters and wireless power receivers.

Wireless power systems often include a power transmitter and a power receiver. When a transmission coil of the power transmitter and a receiver coil of the power receiver are positioned close to one another they form a transformer that facilitates inductive transmission of an alternating current (AC) power between the power transmitter and the power receiver. The power receiver often includes a rectifier circuit that converts the AC power into a direct current (DC) power that may be utilized for various loads or components that require DC power to operate. The power transmitter and the power receiver also utilize the transformer to exchange information or messages using various modulation schemes. For example, the power receiver may include a resonant circuit having one or more capacitors and may switch in or switch out a different number of capacitors of the resonant circuit to generate amplitude shift key (ASK) signals and encode messages in the ASK signals. The power receiver can transmit the ASK signals to the power transmitter to communicate with the power transmitter via the transformer. The power transmitter decodes the messages from the ASK signals received from the receiver and encodes response messages in frequency shift key (FSK) signals that may be transmitted back to the power receiver via the transformer.

SUMMARY

In an embodiment, a semiconductor device is disclosed that comprises at least one processing device and firmware comprising a dynamic demodulation engine. The dynamic demodulation engine, when executed by the at least one processing device, is configured to obtain a digital signal waveform, dynamically select a bit detection method based at least in part on a characteristic of the digital signal waveform, perform demodulation of the digital signal waveform using the selected bit detection method and generate decoded packets based at least in part on the demodulation.

In another embodiment, a wireless power transmitter is disclosed that comprises a semiconductor device. The semiconductor device comprises circuitry that is configured to detect a characteristic of a signal received from a transmission coil. The circuitry comprises an analog-to-digital converter that is configured to generate a digital signal waveform based at least in part on the signal received from the transmission coil and the detected characteristic. The semiconductor device further comprises at least one processing device and firmware comprising a dynamic demodulation engine. The dynamic demodulation engine, when executed by the at least one processing device, is configured to obtain the digital signal waveform from the analog-to-digital converter, dynamically select a bit detection method based at least in part on the at least one characteristic of the digital signal waveform, perform demodulation of the digital signal waveform using the selected bit detection method and generate decoded packets based at least in part on the demodulation.

In another embodiment, a method performed by at least one processing device comprising hardware is disclosed that comprises obtaining a digital signal waveform, dynamically selecting a bit detection method based at least in part on a characteristic of the digital signal waveform, performing demodulation of the digital signal waveform using the selected bit detection method and generating decoded packets based at least in part on the demodulation.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

Figure 1:
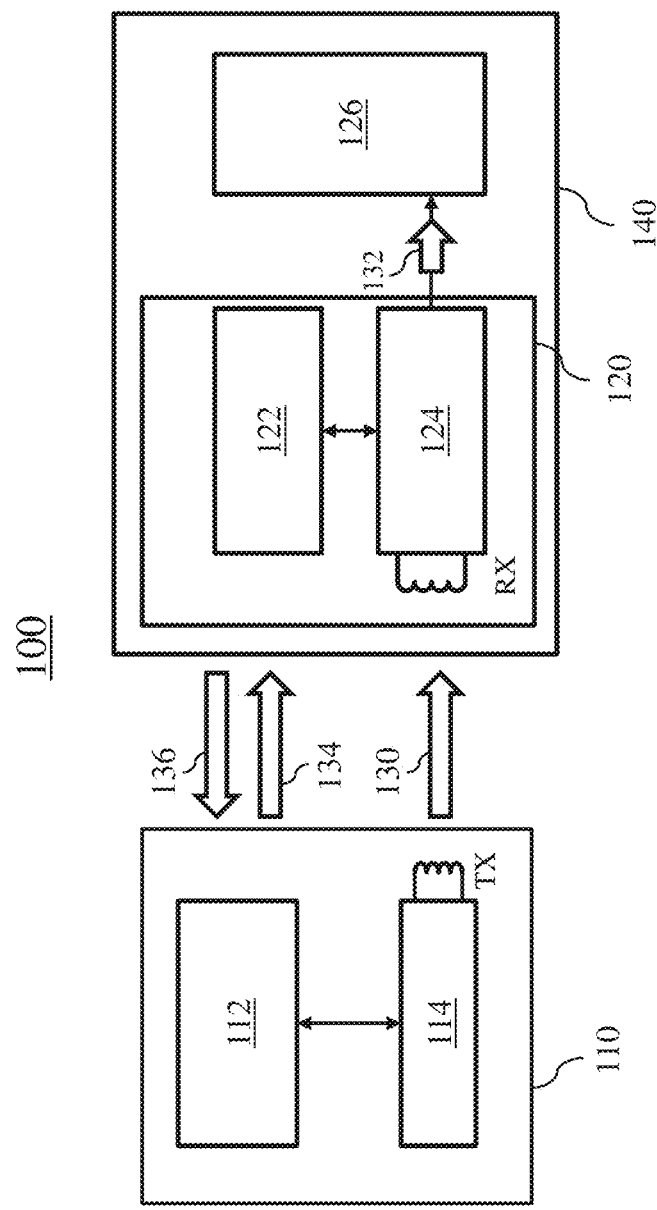
FIG. 1 is a block diagram of an example system for wireless power transfer according to an embodiment.

FIG. 1 is a diagram showing an example system 100 that implements wireless power transfer and communication according to an illustrative embodiment. System 100 comprises a power transmitter 110 and a power receiver 120 that are configured to wirelessly transfer power and data therebetween via inductive coupling. While described herein as power transmitter 110 and power receiver 120, each of power transmitter 110 and power receiver 120 may be configured to both transmit and receive power or data therebetween via inductive coupling.

Power transmitter 110 is configured to receive power from one or more power supplies and to transmit AC power to power receiver 120 wirelessly. For example, power transmitter 110 may be configured for connection to a power supply such as, e.g., an AC power supply or a DC power supply. Power transmitter 110 comprises a controller 112 and a power driver 114.

Controller 112 is configured to control and operate power driver 114. Controller 112 comprises, for example, a processor, central processing unit (CPU), field-programmable gate array (FPGA) or any other circuitry that is configured to control and operate power driver 114. In an example embodiment, controller 112 is configured to control power driver 114 to drive a coil TX of the power driver 114 to produce a magnetic field. Power driver 114 is configured to drive coil TX at a range of frequencies and configurations defined by wireless power standards, such as, e.g., the Wireless Power Consortium (Qi) standard, the Power Matters Alliance (PMA) standard, the Alliance for Wireless Power (A for WP, or Rezence) standard or any other wireless power standards. Controller 112 may be configured as a separate component from power driver 114 or may be included as a part of power driver 114.

Power receiver 120 is configured to receive AC power transmitted from power transmitter 110 and to supply the power to one or more loads 126 or other components of a destination device 140. Destination device 140 may comprise, for example, a computing device, mobile device, mobile telephone, smart device, tablet, wearable device or any other electronic device that is configured to receive power wirelessly. In an illustrative embodiment, destination device 140 comprises power receiver 120. In other embodiments, power receiver 120 may be separate from destination device 140 and connected to destination device 140 via a wire or other component that is configured to provide power to destination device 140.

Power receiver 120 comprises a controller 122 and a power rectifier 124. Controller 122 comprises, for example, a processor, central processing unit (CPU), field-programmable gate array (FPGA) or any other circuitry that may be configured to control and operate power rectifier 124. Power rectifier 124 includes a coil RX and is configured to rectify power received via coil RX into a power type as needed for load 126. For example, power rectifier 124 is configured to rectify AC power received from coil RX into DC power which may then be supplied to load 126.

As an example, when power receiver 120 is placed in proximity to power transmitter 110, the magnetic field produced by coil TX of power driver 114 induces a current in coil RX of power rectifier 124. The induced current causes AC power 130 to be inductively transmitted from power driver 114 to power rectifier 124. Power rectifier 124 receives AC power 130 and converts AC power 130 into DC power 132. DC power 132 is then provided by power rectifier 124 to load 126. Load 126 may comprise, for example, a battery charger that is configured to charge a battery of the destination device 140, a DC-DC converter that is configured to supply power to a processor, a display, or other electronic components of the destination device 140, or any other load of the destination device 140.

Power transmitter 110 and power receiver 120 are also configured to exchange information or data, e.g., messages, via the inductive coupling of power driver 114 and power rectifier 124. For example, before power transmitter 110 begins transferring power to power receiver 120, a power contract may be agreed upon and created between power receiver 120 and power transmitter 110. For example, power receiver 120 may send communication packets or other data to power transmitter 110 that indicate power transfer information such as, e.g., an amount of power to be transferred to power receiver 120, commands to increase, decrease, or maintain a power level of AC power 130, commands to stop a power transfer, or other power transfer information. In another example, in response to power receiver 120 being brought in proximity to power transmitter 110, e.g., close enough such that a transformer may be formed by coil TX and coil RX to facilitate power transfer, power receiver 120 may be configured to initiate communication by sending a signal to power transmitter 110 that requests a power transfer. In such a case, power transmitter 110 may respond to the request by power receiver 120 by establishing the power contract or beginning power transfer to power receiver 120, e.g., if the power contract is already in place.

Power transmitter 110 and power receiver 120 may transmit and receive communication packets, data or other information via the inductive coupling of coil TX and coil RX. As an example, communication packet sent from power transmitter 110 to power receiver 120 may comprise frequency shift key (FSK) signals 134. FSK signals 134 are frequency modulated signals that represent digital data using variations in the frequency of a carrier wave. Communication packets sent from power receiver 120 to power transmitter 110 may comprise amplitude shift key (ASK) signals 136. ASK signals 136 are amplitude modulated signals that represent digital data using variations in the amplitude of a carrier wave. While power transmitter 110 is described as sending FSK signals 134 and power receiver 120 is described as sending ASK signals 136, in other embodiments, power receiver 120 may alternatively send FSK signals and power transmitter 110 may alternatively send ASK signals. Any other manner of transmitting communication packets, data or other information between power transmitter 110 and power receiver 120 may alternatively be used.

Referring now to FIGS. 2-5, illustrative embodiments of power driver 114 will now be described.

Power driver 114 comprises power driver circuitry 116 including, e.g., a transmission coil $PTx_{COIL}$, coil capacitor $C_P$, field effect transistors (FETs) Q1, Q2, Q3 and Q4 such as, e.g., MOSFETs, and other circuitry commonly found in power driver circuitry that is configured to drive transmission coil $PTx_{COIL}$ to generate a magnetic field for transferring power or information to power receiver 120. While described herein as having one transmission coil, coil capacitor or other circuitry components, power driver circuitry 116 may alternatively have more or fewer of these components. As an example, in some embodiments a single transmission coil, two transmission coils, three transmission coils, four transmission coils or any other number of transmission coils may be included.

Figure 2:
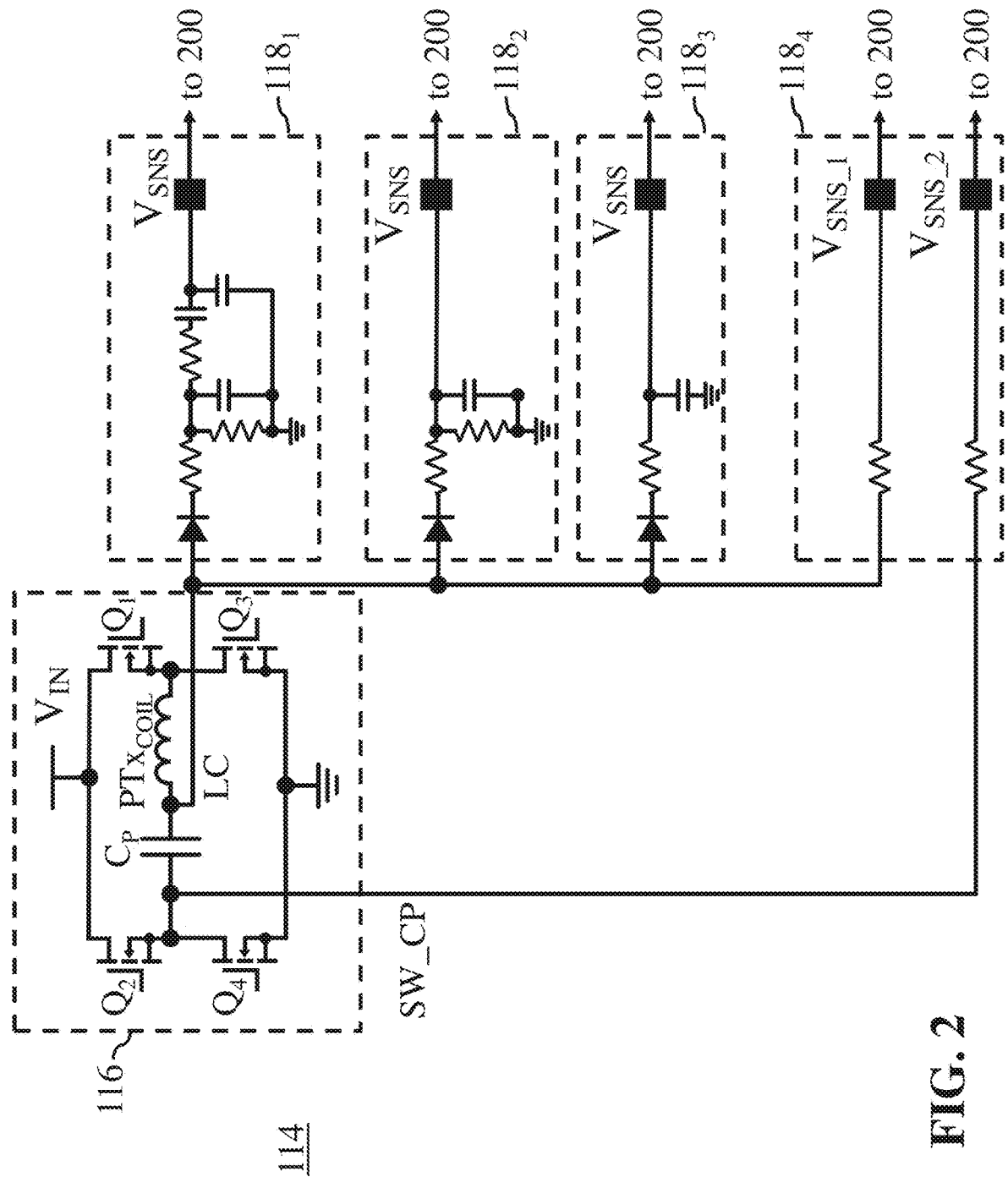
FIG. 2 is a circuit diagram illustrating an example power transmitter of the system of FIG. 1 according to an embodiment.

Power driver 114 comprises one or more components of external circuitry 118 and a semiconductor device 200. FIG. 2 illustrates various embodiments of external circuitry 118 including, e.g., an embodiment of power driver 114 comprising external circuitry $118_1$, an embodiment of power driver 114 comprising external circuitry $118_2$, an embodiment of power driver 114 comprising external circuitry $118_3$ and an embodiment of power driver 114 comprising external circuitry $118_4$, collectively and individually referred to herein as external circuitry 118. Any other external circuitry 118 may also or alternatively be utilized. In some embodiments, only one of external circuitry $118_1$, external circuitry $118_2$, external circuitry $118_3$ and external circuitry $118_4$ is utilized.

Each embodiment of external circuitry 118 is utilized to output a voltage $V_{SNS}$ based on one or both of outputs LC and SW_CP of power driver circuit 116. For example, LC may be connected to a node between transmission coil $PTx_{COIL}$ and coil capacitor $C_P$ while SW_CP may be connected to a node on an opposite side of coil capacitor $C_P$ from transmission coil $PTx_{COIL}$. $V_{SNS}$ is provided to semiconductor device 200.

As an example, the embodiment of external circuitry $118_1$ is configured to perform external envelope tracking and analog filtering on SW_CP to generate $V_{SNS}$. In another example, the embodiment of external circuitry $118_2$ is configured to perform external envelope tracking with a passive reset on SW_CP to generate $V_{SNS}$ with filtering functionality being provided by semiconductor device 200. In another example, the embodiment of external circuitry $118_3$ is configured to perform external envelope tracking on SW_CP to generate $V_{SNS}$ with active reset, attenuation and filtering functionality being provided by semiconductor device 200. In another example, the embodiment of external circuitry 118$_4$ is configured to perform attenuation on SW_CP and LC to generate $V_{SNS\_1}$ and $V_{SNS\_2}$ with envelope tracking, active reset, further attenuation and single ended or differential filtering being performed by semiconductor device 200.

Semiconductor device 200, e.g., a printed circuit board (PCB), integrated circuit (IC) or other circuitry, comprises analog to digital instrumentation filters and an analog to digital converter (ADC) and is configured convert the signals received from transmission coil $PTx_{COIL}$ into digital datasets. In some embodiments, semiconductor device 200 may include controller 112.

Figure 3:
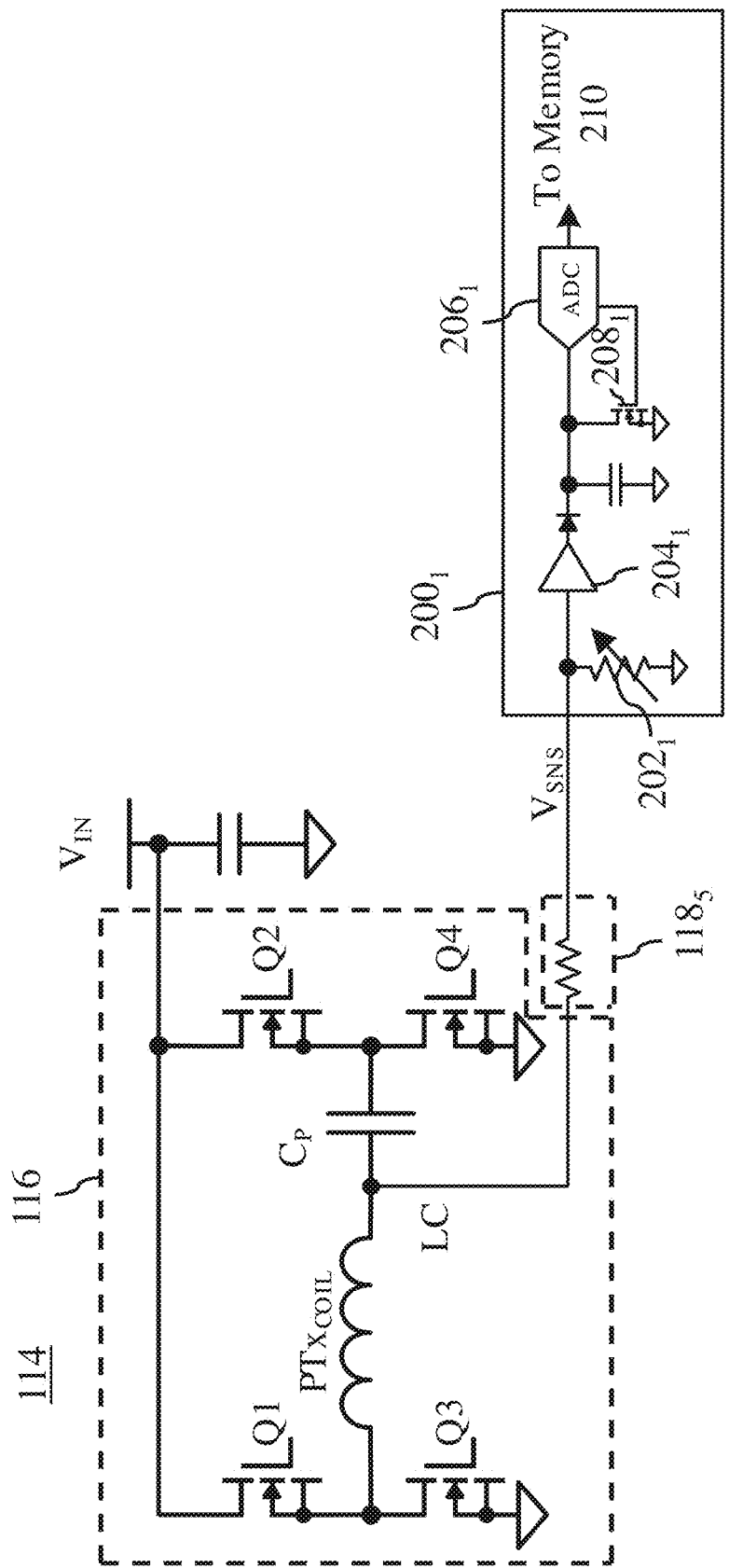
FIG. 3 is a circuit diagram illustrating an example power transmitter of the system of FIG. 1 according to another embodiment.

With reference to FIG. 3, an example embodiment of power driver 114 comprising a semiconductor device 200$_1$ will now be described. In the embodiment of FIG. 3, output LC of power driver circuitry 116 is connected to external circuitry 118$_5$ which provides $V_{SNS}$ to semiconductor device 200$_1$. External circuitry 118$_5$ comprises a resistor that is configured to function as an attenuator. Semiconductor device 200$_1$ comprises a variable resistor 202$_1$ connected to $V_{SNS}$, an amplifier 204$_1$ receiving $V_{SNS}$ as an input, an analog-to-digital converter (ADC) 206$_1$ and a transistor 208$_1$. Semiconductor device 200$_1$ is configured to perform single ended peak detection with an envelope filter synchronous reset by transistor 208$_1$. Semiconductor device 200$_1$ outputs a digital signal from ADC 206$_1$ to memory 210 such as, e.g., synchronous dynamic random-access memory (SDRAM), static random access memory (SRAM), dynamic random-access memory (DRAM) or other types of memory, to generate digital datasets. While semiconductor device 200$_1$ is illustrated in FIG. 3 as comprising particular circuitry, additional or alternative circuitry may also or alternatively be utilized. By utilizing semiconductor device 200$_1$ which has an internal peak detector and ADC to create a digital envelope detector, variability due to non-symmetric behavior and power dissipation concerns of an external envelope detection may be inhibited or eliminated.

Figure 4:
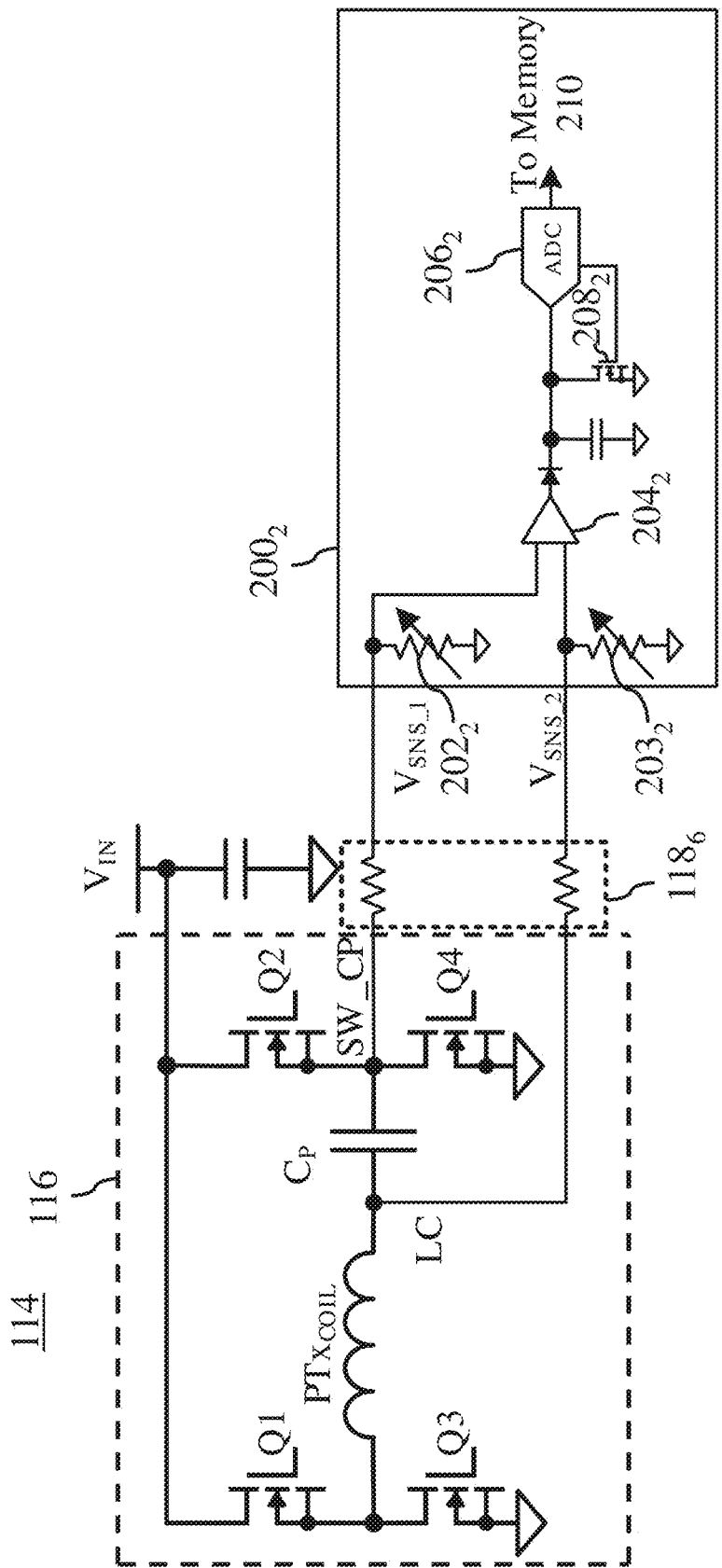
FIG. 4 is a circuit diagram illustrating an example power transmitter of the system of FIG. 1 according to another embodiment.

With reference to FIG. 4, an example embodiment of power driver 114 comprising a semiconductor device 200$_2$ will now be described. In the embodiment of FIG. 4, outputs LC and SW_CP of power driver circuitry 116 are connected to external circuitry 118$_6$ which separately provides output voltages $V_{SNS\_1}$ and $V_{SNS\_2}$ to semiconductor device 200$_2$. External circuitry 118$_6$ comprises a pair of resistors, one for each output. In some embodiments, the resistors of external circuitry 118$_6$ may be matched for improved accuracy. Semiconductor device 200$_2$ comprises a variable resistor 202$_2$ connected to $V_{SNS\_1}$, a variable resistor 203$_2$ connected to $V_{SNS\_2}$, an amplifier 204$_2$ receiving $V_{SNS\_1}$ and $V_{SNS\_2}$ as inputs, an ADC 206$_2$ and a transistor 208$_2$. Semiconductor device 200$_2$ and is configured to perform both single ended and differential peak detection with an envelope filter synchronous reset by transistor 208$_2$. Semiconductor device 200$_2$ outputs digitals signal from ADC 206$_2$ to memory 210 to generate digital datasets. While semiconductor device 200$_2$ is illustrated in FIG. 4 as comprising particular circuitry, additional or alternative circuitry may also or alternatively be utilized. By utilizing semiconductor device 200$_2$ which has a fully differential measurement of the voltage across coil capacitor CP voltage, a less noisy signal as compared the embodiment of FIG. 3 may be obtained by eliminating or inhibiting the effect of SW_CP on the single ended waveform which monitors the voltage on output LC.

Figure 5:
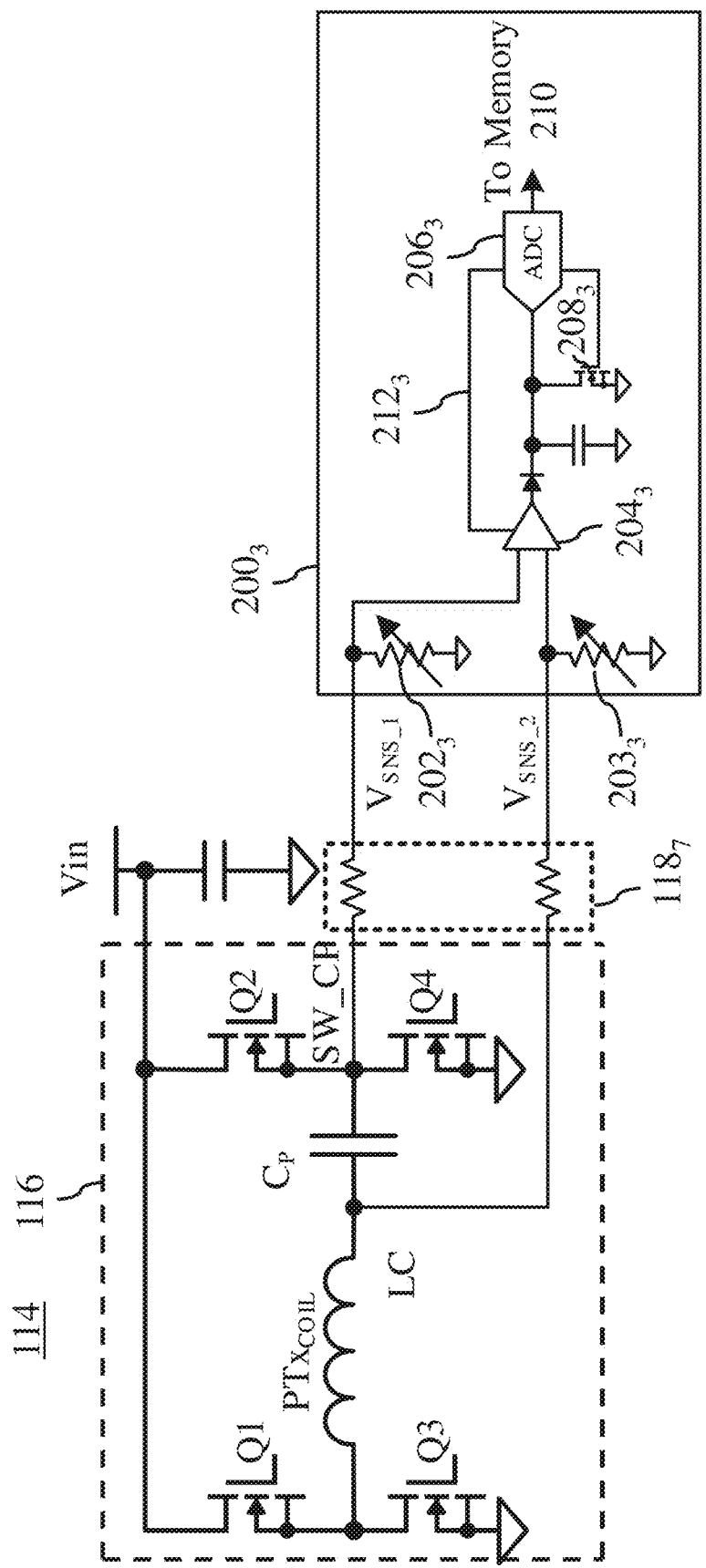
FIG. 5 is a circuit diagram illustrating an example power transmitter of the system of FIG. 1 according to another embodiment.

With reference to FIG. 5, an example embodiment of power driver 114 comprising a semiconductor device 200$_3$ will now be described. In the embodiment of FIG. 5, outputs LC and SW_CP of power driver circuitry 116 are connected to external circuitry 118$_7$ which separately provides output voltages $V_{SNS\_1}$ and $V_{SNS\_2}$ to semiconductor device 200$_3$. External circuitry 118$_7$ comprises a pair of resistors, one for each output. In some embodiments, the resistors of external circuitry 118$_7$ may be matched for improved accuracy. Semiconductor device 200$_3$ comprises a variable resistor 202$_3$ connected to $V_{SNS\_1}$, a variable resistor 203$_3$ connected to $V_{SNS\_2}$, an amplifier 204$_3$ receiving $V_{SNS\_1}$ and $V_{SNS\_2}$ as inputs, an ADC 206$_3$ and a transistor 208$_3$. In this embodiment, a gain inversion control signal 212$_3$, e.g., 1x, x1x or another value, is received by amplifier 204$_3$ from ADC 206$_3$. Semiconductor device 200$_3$ is configured to perform both single ended and differential peak detection and trough detection with an envelope filter synchronous reset by transistor 208$_3$. Semiconductor device 200$_3$ outputs a digital signal from ADC 206$_3$ to memory 210. While semiconductor device 200$_3$ is illustrated in FIG. 5 as comprising particular circuitry, additional or alternative circuitry may also or alternatively be utilized. By utilizing semiconductor device 200$_3$ both peak and trough data may be captured which provides twice the number of samples as compared to the embodiments of FIGS. 3 and 4, improving the ability of digital filters by doubling the sampling rate, for example, as shown in FIGS. 6 and 7.

Figure 6:
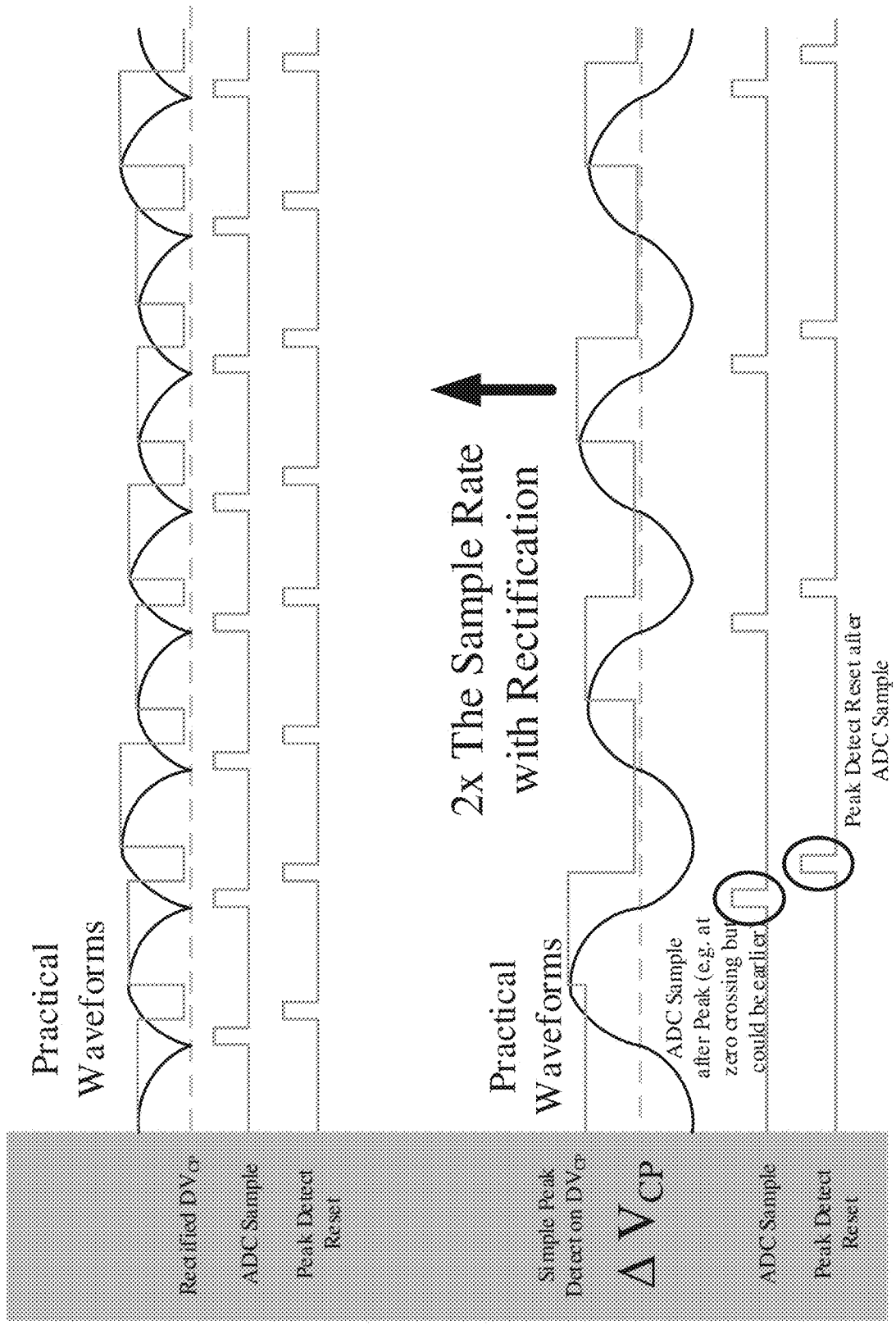
FIG. 6 is a diagram illustrating an example rectified waveform of the system of FIG. 1 according to an embodiment.

With reference to FIG. 6, an example diagram showing the capture of both peaks and troughs for twice the sample rate is illustrated. As shown in FIG. 6, simple peak detection is applied on the voltage difference waveform $\Delta V_{CP}$ across capacitor CP to determine where the peaks of the waveform are located. In addition, ADC sampling after the peak is performed, e.g., at zero crossing, prior to zero crossing or at another part of the waveform, followed by a peak detect reset after the ADC sample. The ADC sample and peak detect reset enable waveform to be rectified such that the trough becomes another peak of the waveform as shown by the rectified waveform. Simple peak detection may then be utilized to identify each peak of the rectified waveform, resulting in twice the sampling rate as compared to voltage difference waveform $\Delta V_{CP}$.

Figure 7:
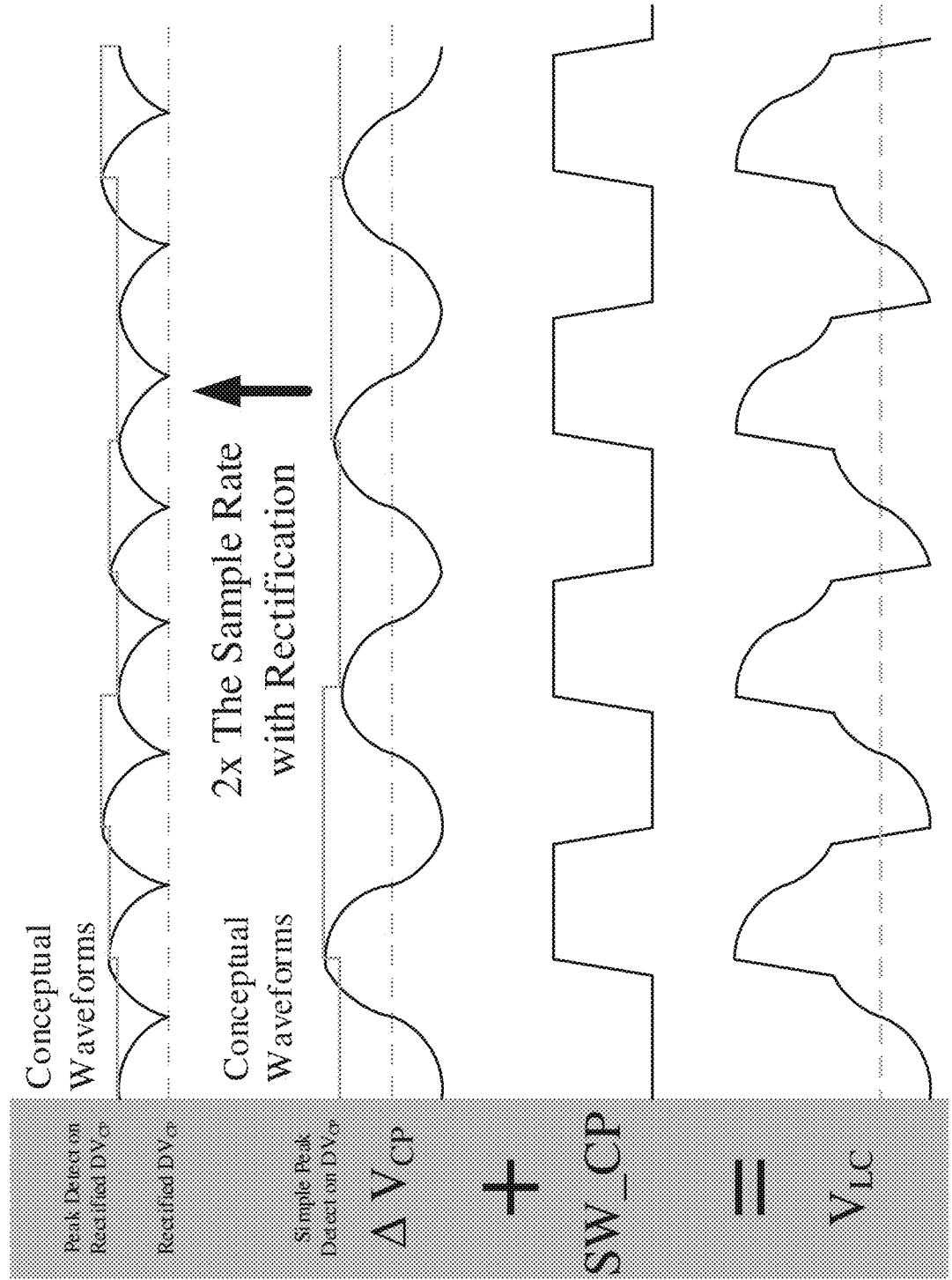
FIG. 7 is a diagram illustrating another example rectified waveform of the system of FIG. 1 according to an embodiment.

With reference to FIG. 7, in another example diagram, a voltage waveform $V_{LC}$ of the voltage on output LC along with the waveform produced on output SW_CP may be utilized with the voltage difference waveform $\Delta V_{CP}$ to identify the troughs in voltage difference waveform $\Delta V_{CP}$ and rectify the waveform for twice the sample rate.

In the described embodiments, semiconductor devices 200$_1$, 200$_2$ and 200$_3$ may be collectively and individually referred to herein as semiconductor device(s) 200, ADCs 206$_1$, 206$_2$ and 206$_3$ may be collectively and individually referred to herein as ADC(s) 206, and transistors 208$_1$, 208$_2$ and 208$_3$ may be collectively and individually referred to herein as transistor(s) 208.

Figure 8:
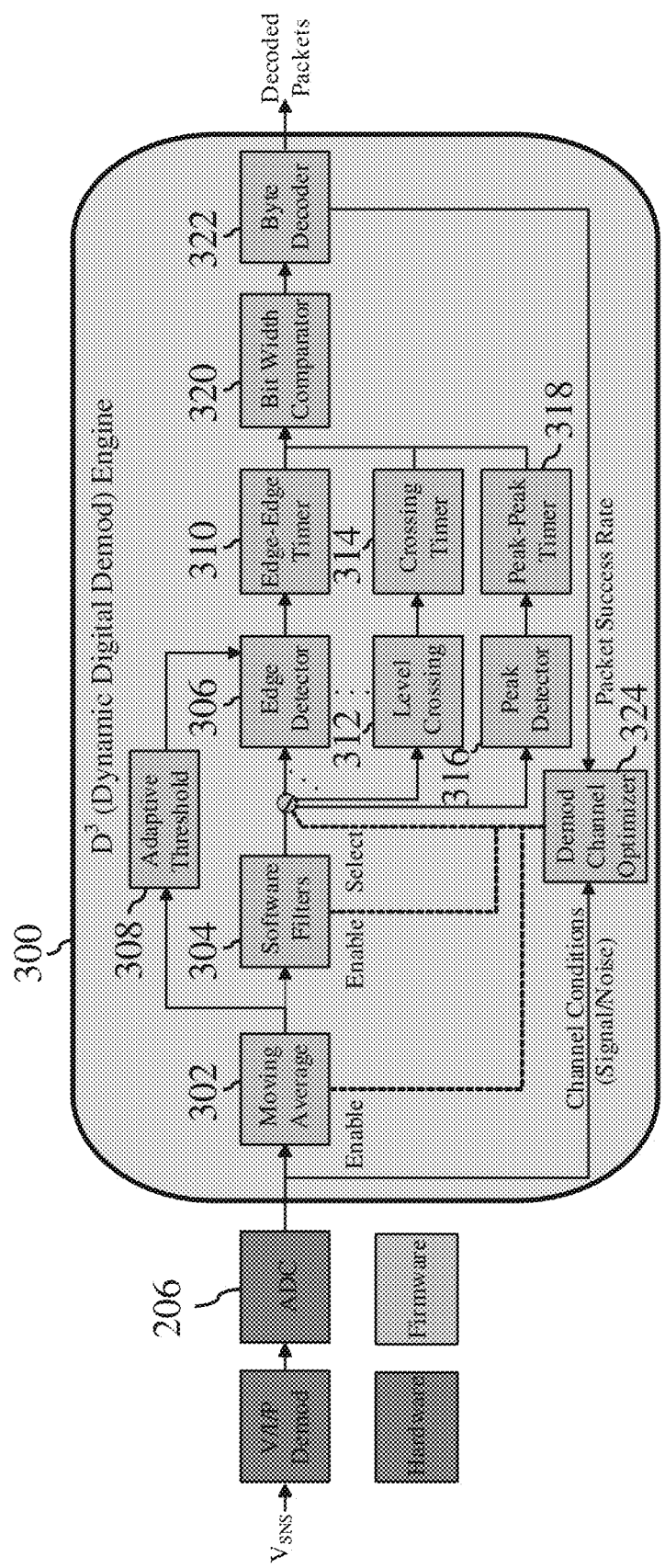
FIG. 8 is a block diagram of an example dynamic digital demodulation engine of the system of FIG. 1 according to an embodiment.

With reference to FIG. 8, a dynamic digital demodulation (D3) engine 300 of power driver 114 according to an illustrative embodiment will be described. In some embodiments, D3 engine 300 comprises software or firmware installed in memory such as, e.g., SRAM, of semiconductor device 200 and is executable by at least one processing device or other processing circuitry of semiconductor device 200. In some embodiments, D3 engine 300 may be executable by controller 112 or by other processing circuitry of power driver 114.

D3 engine 300 comprises one or more algorithms that are optimized for demodulating and decoding wireless power communication (WPC) standard packets such as, e.g., ASK and FSK packets. In an illustrative embodiment, D3 engine 300 comprises a firmware-based demodulator that utilizes information from channel conditions such as, e.g., signal quality and noise levels, and feedback information from a byte decoder to dynamically enable or disable various demodulation signal processing blocks and to select one or more bit decoding methods to be executed on the waveform output by ADC 206. By dynamically enabling or disabling the demodulation signal processing blocks, the filtering and processing of demodulated signals to obtain ASK or FSK data packets may be optimized in real-time for the variable channel conditions which occur during a wireless power transfer.

For example, as illustrated in FIG. 8, D3 engine 300 comprises signal demodulation processing blocks including, e.g., a moving average block 302, software filter blocks 304, an edge detector block 306, an adaptive threshold block 308, an edge-to-edge timer block 310, a level crossing detector block 312, a crossing timer block 314, a peak detector block 316, a peak-to-peak timer block 318, a bit width comparator block 320, a byte decoder block 322, a demodulation channel optimizer block 324 and any other signal demodulation processing block or algorithm that may be utilized to demodulate a signal and generate decoded ASK or FSK packets.

Digital filtering allows for significantly higher filter orders compared to external analog filters which run into impedance limitations in wireless power systems. For example, in single ended designs the LC node voltage can be, e.g., 100V while the resistance of the external envelope tracker circuitry cannot be too low since the input resistor would then consume too much power. An example resistance of the external envelope tracker circuitry may be, e.g., 2 kOhm. In addition, for an external analog filter, every subsequent analog filter typically should have 5× to 10× higher impedance than the previous filter. Since PCB manufacturing limitations practically limit the size of the filter components to a maximum resistance of about 500 kOhm, there is a practical limit of three to four analog filter stages before this limit is reached. For example, if all filter time constants are approximately equal and a 10× increase is utilized, a three stage system may comprise, e.g., a first stage having a 2 kOhm resistance, a second stage having a 20 kOhm resistance and a third stage having a 200 kOhm resistance. A 5× increase can be used to provide a first stage having a 2 kOhm resistance, a second stage having a 10 kOhm resistance, a third stage having a 50 kOhm resistance and a fourth stage having a 250 kOhm resistance, but the four stage filter may not be as precise as the three stage filter.

Unlike external analog filters, digital filters in firmware or software can be modified based on the operating state of the system, e.g., standby mode, constant voltage (CV) mode, constant current (CC) mode or other operating modes, or based on other characteristics of the system such as, e.g., signal-to-noise ratio (SNR), slope, peak to peak magnitude, etc. Two example states which have different decoding requirements are the Standby mode of operation and the CV mode of operation.

In the standby mode of operation, also sometimes referred to as digital ping, the SNR is typically good, e.g., have a SNR value that is sufficient to allow packet decoding with minimal signal filtering and processing, but the system typically needs to consume very little power to adhere to regulatory requirements. The standby mode of operation is utilized to detect whether or not a destination device 140 is in proximity to power transmitter 110. In illustrative embodiments, the digital filters of D3 engine 300 are configured to use fewer samples with reduced noise filtering to limit CPU power consumption when in the standby mode of operation.

In the CV mode of operation, a large amount of system noise may be injected into the ASK signal due to an active power transfer between power transmitter 110 and destination device 140, resulting in a very low SNR. In some embodiments, a very low SNR may comprise an SNR of less than or equal to about 5, e.g., about 14 decibels (dB). In some embodiments a very low SNR may comprise an SNR of about 1, e.g., 0 dB. Other SNR values for a very low SNR may also or alternatively be utilized. The CV mode of operation is often utilized when a battery being charged by system 100 is close to fully charged. In some embodiments, for example, the CV mode of operation is utilized when the battery charge level is greater than or equal to a predetermined threshold amount or percentage of the maximum battery charge, e.g., about 65% to about 80% of the maximum battery charge or any other percentage. In some embodiments, the CV mode of operation is utilized when the charging voltage reaches a predetermined threshold voltage. For example, if the battery is being charged at a constant current, e.g., in the CC mode described below, the charging voltage slowly builds up as the battery becomes charged. If the charging voltage exceeds the predetermine threshold voltage, damage to the battery may occur. In some embodiments, for example, the predetermined threshold voltage may comprise 4.2V at a constant current of 3A. In other embodiments, greater or smaller predetermined threshold voltage and constant current may alternatively be utilized depending on the particular configuration and components of the system.

In the CV mode of operation, charging is performed at a constant voltage, e.g., at the predetermined threshold voltage or another voltage, while the current slowly decays to zero to ensure that the voltage does not increase and damage the battery. When controller 112 or another processing device steals charge, the signal rolls back and may sometimes appear as an ASK signal. Because of this effect, ASK packets may be difficult to identify due to the extra noise on the signal and very low SNR which may result in a communication breakdown. Because of the large amount of system noise, extra power consumption is required to filter out the noise and decode the ASK packets from the very low SNR signals.

In the CC mode of operation the SNR is typically good, e.g., has an SNR value that is sufficient to allow packet decoding with minimal signal filtering and processing, and the processing power used by D3 engine 300 can be reduced by utilizing simpler digital filtering and bit detection methods. The CC mode of operation is utilized when the battery is charging but below the predetermined threshold amount or percentage of charge or predetermine threshold voltage for the CV mode of operation and provides a constant current for charging a battery.

In a digital system such as that implemented by D3 engine 300, the noise floor can also be dynamically characterized by demodulation channel optimizer block 324 and used to set the filter coefficients to improve decode rates. In some embodiments, for example, system 100 may be configured to include silent windows between the transmission of ASK signals that may be utilized by demodulation channel optimizer block 324 to identify the noise floor of the signal. For example, demodulation channel optimizer block 324 is configured to monitor the signal level to characterize noise strength, e.g., peak-to-peak, and noise floor, e.g., average noise, in between the ASK communication packets during the silent windows. Demodulation channel optimizer block 324 may further use this information to calculate the SNR, e.g., signal strength during receipt of ASK communication packets in ratio to signal strength during the silent windows where no ASK communication packets are received, and select an appropriate noise filter, e.g., a cascaded lowpass filter, high pass filter, combined low pass and high pass filter or any other noise filter.

Signal characteristics such as differential characteristics, e.g., slope and edge, of the digital signal waveform received from ADC 206 can be utilized by demodulation channel optimizer block 324 to determine which bit decoding methods to enable or select. For example, edge detection performed by edge detector block 306 may provide a more accurate bit timing at edge-edge timer block 310 for a digital signal waveform having a fast decaying signal, e.g., a sequence of spikes, as compared to peak detection performed by peak detector block 316. Similarly, peak detection performed by peak detector block 316 may provide more accurate bit timing at peak-peak timer block 318 for a digital signal waveform having a slowly decaying signal, e.g., a sequence of pulses having shallower slopes than the fast decaying signal, as compared to the edge detection. Demodulation channel optimizer block 324 is configured to characterize the digital signal waveform and change the detection method that is utilized, e.g., to edge detection by edge detector block 306, to peak detection by peak detector block 316 or to other bit detection methods, based on application specific criteria or characteristics of system 100 such as, e.g., signal decay rate, measured noise, or other characteristics or criteria. In some embodiments, more than one detection method may be activated or selected by demodulation channel optimizer block 324 at the same time. For example, in some embodiments both edge detector block 306 and peak detector block 316 may be selected by demodulation channel optimizer block 324 and utilized to perform both edge detection and peak detection at the same time, e.g., when the digital signal waveform output by ADC 206 has a moderate decaying signal between the fast and slowly decaying signals.

In some embodiments, a digital signal waveform characteristics such as relative symmetry over a horizontal axis, e.g., based on average-to-positive vs average-to-negative peaks, may be used by demodulation channel optimizer block 324 to select the bit detection method. For example, relative symmetry over a horizontal axis may be utilized by demodulation channel optimizer block 324 to select level crossing by level crossing detector block 312 and crossing timer block 314 as a bit detection method. A direct current (DC) component of such relatively symmetric signals can also be removed by demodulation channel optimizer block 324 by enabling filtering by one or more of software filter blocks 304 to execute a zero-crossing detection method.

In some embodiments, digital signal waveforms having a high peak to average ratio (PAR) may benefit from the application of a moving average. As an example, a signal waveform having a high PAR may comprise a peak of 2661, an average of 2603 and a mid-level of 2568 giving it a PAR of 93:35 or 256% higher peak than the average relative to the mid-level. In comparison, a signal waveform having a typical PAR may comprise a peak of 1889, an average of 1826 and a mid-level of 1715 giving it a PAR of 174:11 or 156% higher peak than average relative to the mid-level. In some embodiments, other signal waveforms and PAR values also or alternatively be considered high PAR or typical PAR depending on the components and configuration of system 100.

In the case of a high PAR, demodulation channel optimizer block 324 may enable moving average block 302 to reduce the peaks in the system, e.g., by 20%, 30% or any other percentage. In addition, in some embodiments, the moving average window size applied by moving average block 302 may be adjusted by demodulation channel optimizer block 324 based on the PAR level to optimize the effects of the averaging based on application specific criteria or other characteristics of system 100, e.g., such as measured noise. For example, the greater the moving average window size, the more the peaks are reduced. For example, for higher PAR values, a larger moving average window may be utilized to reduce the PAR by a larger amount.

In some embodiments, adaptive threshold block 308 may be utilized by D3 engine 300 to dynamically adjust the thresholds for any of the bit detection methods, e.g., the threshold for edge detection utilized by edge detector block 306, the threshold for determining a level crossing by level crossing detector block 312, the threshold for detecting a peak by peak detector block 316, or any other threshold for the bit detection methods. In some embodiments, if a peak is only 5% higher than average, adaptive threshold block 308 may utilize a threshold of 80%, if a peak is 100% higher than average, adaptive threshold block 308 may utilize a threshold of 40% and so on. In some embodiments, adaptive threshold block 308 calculates the adaptive threshold after the averaging is performed to reduce peaks and condition the signal. In some embodiments, adaptive threshold block 308 is configured to set a threshold of 33% of the peak-to-peak on the conditioned (peak reduced)/averaged signal. Other peak value and threshold values may alternatively be utilized.

The output of the selected bit detection method, e.g., from edge-edge timer block 310, crossing timer block 314, peak-peak timer block 318 or any other bit detection method, is received by bit width comparator block 320 which compares the bit timings to determine and output bit widths to byte decoder block 322. Byte decoder block 322 compares the bit widths to corresponding predetermined message bit widths to decode the signal and generate decoded packets. For example, ASK communication packets may have a consistent window size for the 1 and 0 value in the packet, e.g., the bit widths for each of the 1s and 0s should always be the same. In some embodiments, byte decoder block 322 also generates an indication of packet success rate and provides the indication of packet success rate back to demodulation channel optimizer block 324 for use in determining whether or not to enable moving average block 302 and one or more software filter blocks 304 and also to determine which bit detection method to select. For example, by analyzing previous successful bit timings, demodulation channel optimizer block 324 may enable or select particular blocks in D3 engine 300 to implement a window filter that only looks at the edge/threshold events in a specific time range and rejects noise events that occur outside of the target timing window. As an example, the bit detection timing window may have a soft range of window sizes, e.g., 375-650 μs or other values, that may be adjustable based on previous successful bit decode results instead of an exact window size, e.g., 500 μs, that corresponds an ideal ASK communication packet signal in order to account for noise and other issues with the demodulation of the ASK communication packets.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The disclosed embodiments of the present invention have been presented for purposes of illustration and description but are not intended to be exhaustive or limited to the invention in the forms disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A semiconductor device configured to be disposed in a wireless power transmitter, the semiconductor device comprising:
at least one processing device configured to:
obtain a digital signal waveform corresponding to a signal received from at least one transmission coil of the wireless power transmitter;
dynamically select a bit detection method based at least in part on a characteristic of the digital signal waveform;
perform demodulation of the digital signal waveform using the selected bit detection method; and
generate decoded packets based at least in part on the demodulation.

2. The semiconductor device of claim 1, wherein the processing device is further configured to:
determine a packet success rate based at least in part on the demodulation of the digital signal waveform by the selected bit detection method; and
dynamically select another bit detection method based at least in part on the determined packet success rate.

3. The semiconductor device of claim 1, wherein the processing device is further configured to dynamically enable at least one filter based at least in part on the characteristic of the digital signal waveform.

4. The semiconductor device of claim 1, wherein the processing device is further configured to dynamically enable a moving average detection method based at least in part on the characteristic of the digital signal waveform.

5. The semiconductor device of claim 1, wherein:
the characteristic of the digital signal waveform comprises a decay rate of the digital signal waveform; and
the processing device is further configured to:
select a peak detection method based at least in part on the decay rate being greater than a predetermined threshold; and
select an edge detection method based at least in part on the decay rate being less than the predetermined threshold.

6. The semiconductor device of claim 1, wherein:
the characteristic of the digital signal waveform comprises a relative symmetry over horizontal axis of the digital signal waveform; and
the processing device is further configured to select a level crossing method based at least in part on the relative symmetry over horizontal axis.

7. The semiconductor device of claim 1, wherein:
the characteristic of the digital signal waveform comprises a peak to average ratio of the digital signal waveform; and
the processing device is further configured to enable execution of a moving average algorithm on the digital signal waveform based at least in part on the peak to average ratio.

8. A wireless power transmitter comprising:
a transmission coil configured to generate a signal;
an analog-to-digital converter configured to:
receive the signal from the transmission coil; and
generate a digital signal waveform based at least in part on the signal;
at least one processing device
configured to:
obtain the digital signal waveform from the analog-to-digital converter;
dynamically select a bit detection method based at least in part on at least one characteristic of the digital signal waveform;
perform demodulation of the digital signal waveform using the selected bit detection method; and
generate decoded packets based at least in part on the demodulation.

9. The wireless power transmitter of claim 8, wherein the processing device is further configured to:
determine a packet success rate based at least in part on the demodulation of the digital signal waveform by the selected bit detection method; and
dynamically select another bit detection method based at least in part on the determined packet success rate.

10. The wireless power transmitter of claim 8, wherein the processing device is further configured to dynamically enable at least one filter based at least in part on the characteristic of the digital signal waveform.

11. The wireless power transmitter of claim 8, wherein the processing device is further configured to dynamically enable a moving average detection method based at least in part on the characteristic of the digital signal waveform.

12. The wireless power transmitter of claim 8, wherein:
the characteristic of the digital signal waveform comprises a decay rate of the digital signal waveform; and
the processing device is further configured to:
select an edge detection method based at least in part on the decay rate being greater than a predetermined threshold; and
select a peak detection method based at least in part on the decay rate being less than the predetermined threshold.

13. The wireless power transmitter of claim 8, wherein:
the characteristic of the digital signal waveform comprises a relative symmetry over a horizontal axis of the digital signal waveform; and
the processing device is further configured to select a level crossing method based at least in part on the relative symmetry over horizontal axis.

14. The wireless power transmitter of claim 8, wherein:
the characteristic of the digital signal waveform comprises a peak to average ratio of the digital signal waveform; and the processing device is further configured to enable execution of a moving average algorithm on the digital signal waveform based at least in part on the peak to average ratio.

15. A method performed by at least one processing device of a wireless power transmitter, the method comprising:
   obtaining a digital signal waveform corresponding to a signal received from at least one transmission coil of the wireless power transmitter;
   dynamically selecting a bit detection method based at least in part on a characteristic of the digital signal waveform;
   performing demodulation of the digital signal waveform using the selected bit detection method; and
   generating decoded packets based at least in part on the demodulation.

16. The method of claim 15, further comprising:
   determining a packet success rate based at least in part on the demodulation of the digital signal waveform by the selected bit detection method; and
   dynamically selecting another bit detection method based at least in part on the determined packet success rate.

17. The method of claim 15, further comprising dynamically enabling at least one of a filter or a moving average detection method based at least in part on the characteristic of the digital signal waveform.

18. The method of claim 15, wherein:
   the characteristic of the digital signal waveform comprises a decay rate of the digital signal waveform; and
   the method further comprises:
      selecting an edge detection method based at least in part on the decay rate being greater than a predetermined threshold; and
      selecting a peak detection method based at least in part on the decay rate being less than the predetermined threshold.

19. The method of claim 15, wherein:
   the characteristic of the digital signal waveform comprises a relative symmetry over horizontal axis of the digital signal waveform; and
   the method further comprises selecting a level crossing method as the bit detection method based at least in part on the relative symmetry over horizontal axis.

20. The method of claim 15, wherein:
   the characteristic of the digital signal waveform comprises a peak to average ratio of the digital signal waveform; and
   the method further comprises applying a moving average algorithm on the digital signal waveform based at least in part on the peak to average ratio.

* * * * *